July 28, 1953     J. BURNHAM     2,647,079
PRODUCTION OF INSULATED CONDENSER ELECTRODES
Filed June 3, 1948
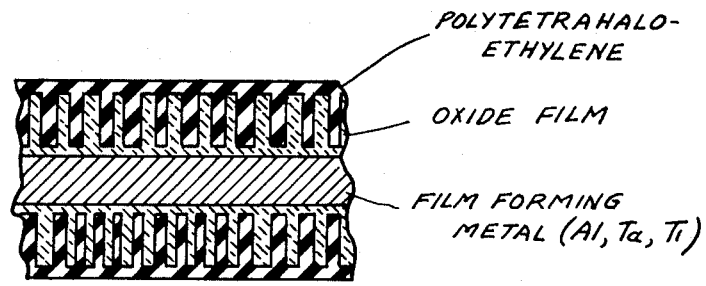
POLYTETRAHALO-
ETHYLENE
OXIDE FILM
FILM FORMING
METAL (Al, Ta, Ti)
JOHN BURNHAM
INVENTOR.
BY Arthur G. Connolly
his attorney Patented July 28, 1953

2,647,079

UNITED STATES PATENT OFFICE 2,647,079

PRODUCTION OF INSULATED CONDENSER ELECTRODES

John Burnham, Williamstown, Mass., assignor to Sprague Electric Company, North Adams, Mass., a corporation of Massachusetts Application June 3, 1948, Serial No. 30,841

3 Claims. (Cl. 204—38)

This invention relates to insulated electrical conductors and more specifically refers to insulated condenser electrodes and electrical condensers employing same.

The use of formed oxide films on aluminum in electrostatic condenser constructions is well known in the art. Despite the volume of references describing such films and condensers, there has been no commercial success with condensers of this type. This may be attributed to several disadvantages inherent in prior procedures and structures. First, the oxide films are relatively fragile and difficultly handled without damaging the insulation. Second, it has been difficult to adequately provide insulation within the cracks and weak spots of the oxide film. In the manufacture of electrolytic condensers, such weak spots are overcome by the forming of additional oxide film during the aging or use of the condenser. This self-healing feature is not possible in electrostatic condensers. Other disadvantages have resulted from the inability to operate the condenser electrodes at very high temperatures, eliminating some of the possible advantage of an aluminum oxide film over organic dielectric materials.

It is an object of the present invention to overcome the foregoing and related disadvantages. A further object is to produce new and improved insulated electrical conductors which are particularly applicable in the manufacture of electrical condensers. Additional objects will become apparent from the following description and claims.

These objects are obtained in accordance with the invention where there is produced an insulated conductor selected from the class containing aluminum, tantalum and titanium, the surface of said metal being provided with an adherent porous film of the oxide of the metal, the pores of said oxide film being impregnated with a polytetrahaloethylene resin. In a restricted sense, the invention is concerned with an insulated condenser electrode comprising aluminum on the surface of which is an adherent porous aluminum oxide film, the pores of which are impregnated with particles of a polytetrahaloethylene resin. In one of its preferred embodiments, the invention is concerned with an insulated condenser electrode comprising aluminum, on the surface of which is an adherent porous aluminum oxide film between about 1.0 micron and about 400 microns in thickness, the pores being impregnated with polytetrafluoroethylene particles. The invention is also concerned with novel methods for producing the insulated conductors of the invention.

I have discovered that highly useful and desirable insulated conductors may be produced with film forming metals, such as aluminum, titanium and tantalum, by a true impregnation of the pores of the oxide film with a polytetrahaloethylene resin. In contrast to prior so-called dry oxide films, my insulation is durable, tough, non-inflammable and may be operated at extremely high temperatures. According to my invention, the base electrode is treated to produce an oxide film thereon by electrolytic methods and prior to drying of the film is subjected to a treatment with a suspension of polytetrahaloethylene resin particles. These particles are deposited in the pores of the oxide film and are subsequently sintered to produce a dielectric of heretofore unobtainable properties.

The metals which may serve as base electrodes in accordance with my invention include aluminum, titanium and tantalum. These are provided with a porous oxide film by anodic treatment in an appropriate electrolyte. The pores in the film generally extend perpendicularly to the plane of the base metal surface. Representative electrolytes are oxalic acid, citric acid, boric acid, chromic acid and the like. Where high porosity is desired on aluminum, for example, I prefer to form an oxide on the metal in an oxalic acid electrolyte. For very high voltage films, I prefer to form a porous oxide film on the metal from an oxalic acid electrolyte and subsequently form a less porous oxide film thereon from a boric acid electrolyte. As a general rule, the formation in the oxalic acid electrolyte should be conducted between about 2 volts and about 600 volts. The boric acid film formation process may be conducted at voltages up to about 1800 volts. Prior to drying of the oxide film, the treatment with the resin particles is carried out as described below. It is, however, desirable to wash the residual electrolyte from the film with water or a solvent for the electrolyte.

The resin is polytetrahaloethylene resin or a copolymer of a tetrahaloethylene with another polymerizable material. Representative resins are polytetrafluoroethylene, polytrifluorochloroethylene, polytetrachloroethylene and the like. These may be suspended in water or other medium by use of an appropriate suspension agent, or polymerized in the presence of the medium. The suspension medium should be compatible with the electrolyte solvent, for example, when a water solution of oxalic acid is used as the electrolyte and water is used as the washing medium, the suspending medium for the resin particles should be water or a water-soluble material to insure thorough impregnation of the pores of the coating. The metal with its undried oxide film thereon is passed through a suspension of resin particles, then dried and subjected to a temperature sufficient to cause sintering of the resin particles together.

The temperature for the particle sintering depends, of course, upon the particular resin employed. In the case of polytetrafluoroethylene the temperature is preferably between about 350° C. and 425° C. The electrode is thereby insulated for high voltages, is durable and tough, is resistant to moisture and common solvents, and will not sustain flame.

The invention will be further described with reference to the appended drawing which shows a cross-section of an insulated conductor. The base metal is provided with a porous oxide film corresponding to the underlying metal. The pores of the oxide film are impregnated with the resin, in the form of sintered particles. If so desired, the resin may be provided in excess, for example, by a multiple treatment to form a continuous, impervious top coating, thus increasing the electrical breakdown voltage. The dielectric constant of the oxide is greater than that of the resin and it is often desirable to limit the thickness of the top coating of resin.

Conductors insulated in accordance with the invention are particularly useful in the manufacture of electrical condensers. Two electrode foils, at least one of which is insulated as described above, may be stacked or rolled in the usual manner to produce an extremely durable high-temperature condenser. For high voltage applications, it is desirable to employ initially thicker oxide films, and then to treat them in accordance with the invention. If so desired, the surface of the insulated conductor such as shown in the figure may be provided with a metal coating, such as evaporated, sprayed or mechanically deposited silver, zinc, copper and the like, to produce an integral electrode and thus a complete condenser section.

The invention is, of course, applicable to many other devices, such as insulated wires, insulated electrical structural members, corrosion resistant mechanical assemblies and the like.

It is contemplated that the impregnation of the pores may be accomplished by drying the oxide film and heating the assembly to a high temperature, e. g. 300° C. or higher, thus expanding and driving out much of the air filling the pores. The assembly may then be quenched in the suspension of resin particles, drawing them into the pores. Thereafter, the film may be dried and the resin particles sintered as heretofore described.

As many widely different embodiments of this invention may be made without departing from the spirit and scope hereof, it is to be understood that the invention is not limited to the specific embodiments hereof except as defined in the appended claims.

I claim:

1. A process for producing insulated condenser electrodes which comprises anodically oxidizing a foil of a metal selected from the class consisting of aluminum, tantalum and titanium in a film forming electrolyte to form on the foil a porous oxide film having a thickness of from 1 to 400 microns, washing the porous oxide film with a liquid which is a solvent for the electrolyte to flush away the electrolyte, contacting the washed and undried film with a suspension of particles of a polytetrahaloethylene resin in a vehicle soluble in the washing liquid to impregnate the pores of the film with such resin particles, drying the impregnated film and sintering the resin particles together.

2. A process as claimed in claim 1, wherein the resin is polytetrafluoroethylene, the washing liquid and suspension vehicle are both water, and the sintering is carried out at temperatures between about 350° C. and 425° C.

3. A process as claimed in claim 1, wherein the porous oxide film is formed on an aluminum foil by first electrolyzing the latter in an oxalic acid electrolyte and then in a boric acid electrolyte.

JOHN BURNHAM.

References Cited in the file of this patent

UNITED STATES PATENTS

| Number | Name | Date |
|---|---|---|
| 1,981,968 | Patrick | Nov. 27, 1934 |
| 2,125,387 | Mason | Aug. 2, 1938 |
| 2,214,876 | Clark | Sept. 17, 1940 |
| 2,231,407 | Castor et al. | Feb. 11, 1941 |
| 2,262,967 | Schenk | Nov. 18, 1941 |
| 2,392,388 | Joyce | Jan. 8, 1946 |
| 2,392,389 | Joyce | Jan. 8, 1946 |
| 2,408,910 | Burnham | Oct. 8, 1946 |
| 2,448,513 | Brennan et al. | Sept. 7, 1948 |
| 2,448,952 | Berry | Sept. 7, 1948 |